United States Patent [19]

Hoshi

[11] Patent Number: 5,676,861
[45] Date of Patent: Oct. 14, 1997

[54] LASER GUIDED DISCHARGE MACHINING APPARATUS

[75] Inventor: Yoshinobu Hoshi, Tsukuba, Japan

[73] Assignee: Agency of Industrial Science & Technology, Ministry of International Trade & Industry, Tokyo, Japan

[21] Appl. No.: 725,678

[22] Filed: Oct. 2, 1996

[30] Foreign Application Priority Data

Oct. 6, 1995 [JP] Japan .................. 7-286877

[51] Int. Cl.$^6$ .................................................. B23H 1/02
[52] U.S. Cl. .............................. 219/69.13; 219/69.17
[58] Field of Search ..................... 219/69.11, 69.13, 219/69.17, 121.6

[56] References Cited

U.S. PATENT DOCUMENTS

| | | | |
|---|---|---|---|
| 4,728,764 | 3/1988 | Matsumoto et al. | 219/69.13 |
| 4,829,153 | 5/1989 | Correy | 219/121.6 |
| 4,847,463 | 7/1989 | Levy et al. | 219/69.17 |
| 4,892,989 | 1/1990 | Itoh | 219/69.13 |
| 5,496,983 | 3/1996 | Hoshi | 219/69.17 |

FOREIGN PATENT DOCUMENTS

| | | |
|---|---|---|
| 5277832 | 10/1993 | Japan . |
| 8155670 | 6/1996 | Japan . |

*Primary Examiner*—Geofrey S. Evans
*Attorney, Agent, or Firm*—Oblon, Spivak, McClelland, Maier & Neustadt, P.C.

[57] ABSTRACT

A laser guided discharge machining apparatus includes a vacuum chamber able to accommodate a workpiece and in which it is possible to create a reduced pressure condition of 3000 Pa or below, a discharge electrode accommodated in the vacuum chamber able to discharge charged particles, a laser that emits a laser beam toward the vacuum chamber, a laser guidance apparatus for guiding the laser beam to irradiate a part of the workpiece in the vacuum chamber, and a discharge delay measurement apparatus for detecting a time delay between a time at which laser irradiation is triggered and a time at which discharge takes place from the discharge electrode.

3 Claims, 5 Drawing Sheets

LASER GUIDED DISCHARGE MACHINING APPARATUS

BACKGROUND OF THE INVENTION

1. Field of the Invention

This invention relates to a laser guided discharge apparatus used for diesinking and other metal machining applications, and more particularly to a laser guided discharge apparatus used for machining of a workpiece that includes an apparatus for confirming discharge guidance.

2. Description of the Prior Art

Discharge machining in which a laser beam is used to guide the discharge to a portion of a workpiece is an efficient machining technique. This laser induced discharge guidance technology formed a basis for the previous development by the present inventors of a discharge machining apparatus that enabled the machining of parts not in a direct line of sight from the discharge electrode, such as the inside of a pot with a small mouth, for example (see U.S. Pat. No. 5,496,983). This previous laser guided discharge machining apparatus comprises a vacuum chamber able to accommodate a workpiece and a discharge electrode and in which it is possible to create a reduced pressure condition of 3000 Pa or below, and a laser irradiation apparatus able to irradiate a part of the workpiece that is not facing the discharge electrode. Thus, when in the reduced pressure environment the laser is projected at a part of the workpiece such as the rear that is not in a direct line of sight position from the discharge electrode and the discharge is triggered, the charged particles discharged from the electrode follow the line of electrical power around to the rear of the workpiece, and are induced by the laser beam to cause them to impinge on the workpiece at the point at which the workpiece is being irradiated by the laser beam, thereby machining the workpiece at that point. Moving the laser beam produces a corresponding shift in the location of the machining. In this way, it is possible to perform three-dimensional machining of parts that are not in a direct line of sight from the discharge electrode.

The laser beam based discharge guidance induction is effected via plasma generated on the workpiece surface by the laser beam irradiation, so discharge guidance is controlled by using prescribed voltages and pressures. As such, unlike a conventional discharge machining method in which the discharge electrode is in contact with the workpiece, in the case of laser guided discharge machining, whether or not the discharge is being effectively guided in that environment is of key importance. So far, however, the only way to confirm whether the discharge is being guided correctly has been to stop the discharge process, remove the workpiece from the vacuum chamber and look at the state of the machining. Because of the high speed of the discharge guidance phenomenon—in the order of several tens of microseconds—and the high brightness, establishing the guidance point is difficult, even with video equipment and the like.

An object of the present invention is to provide a laser guided discharge machining apparatus that when discharge is triggered is able to readily and reliably confirm whether or not the discharge is being guided effectively by the laser without requiring direct visual observation of the workpiece.

SUMMARY OF THE INVENTION

In accordance with this invention, the above object is attained by a laser guided discharge machining apparatus, comprising a vacuum chamber able to accommodate a workpiece and in which it is possible to create a reduced pressure condition of 3000 Pa or below, a discharge electrode accommodated in the vacuum chamber able to discharge charged particles, a laser that emits a laser beam toward the vacuum chamber, a laser guidance apparatus for guiding the laser beam to irradiate a part of the workpiece in the vacuum chamber, and a discharge delay measurement apparatus for detecting a time delay between a time at which laser irradiation is triggered and a time at which discharge takes place from the discharge electrode.

The discharge delay measurement apparatus measures the time period from the start of the discharge to the point at which the discharge reaches a peak value. A discharge is being guided by the laser when the time delay period is short, that is up to 10 μs. Laser guided discharge machining of a prescribed portion of a workpiece therefore can effectively be implemented by controlling conditions such as the degree of reduced pressure, the voltage applied across the electrodes, and the laser radiation energy to maintain the prescribed time delay.

Further features of the invention, its nature and various advantages will be move apparent from the accompanying drawings and following detailed description of the invention.

DESCRIPTION OF THE PREFERRED EMBODIMENT

Figure 1:
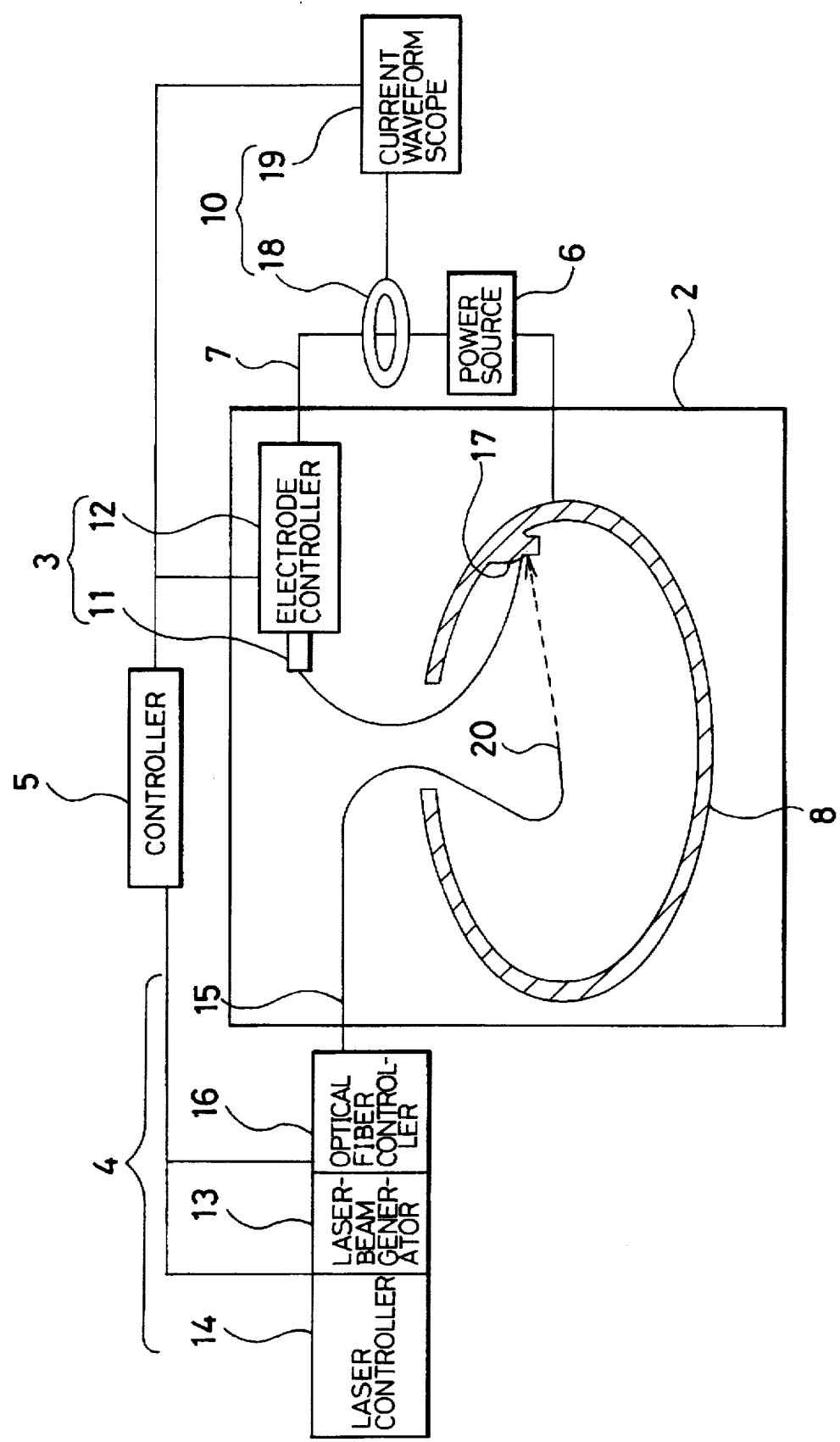
FIG. 1 is a schematic diagram of the discharge machining apparatus according to one embodiment of the invention.

FIG. 1 is a diagram of an embodiment of the discharge machining apparatus of the present invention. In FIG. 1, a discharge machining apparatus 1 is provided with a vacuum chamber 2, a discharge apparatus 3, a laser irradiation apparatus 4, a controller 5, an electrical power source 6 and a circuit 7. The pressure in the vacuum chamber 2 can be reduced to 3000 Pa or below, and the interior of the vacuum chamber 2 can accommodate a workpiece 8. The discharge apparatus 3 has an electrode 11 and an electrode controller 12. The electrode controller 12 pays out more of the electrode 11 to compensate for wear to the electrode 11, and controls the current supplied to the electrode 11 from the power source 6. The electrode controller 12 is controlled by the controller 5, which may be a computer, for example. The laser irradiation apparatus 4 is comprised of a laser-beam generator 13, a laser controller 14, an optical fiber 15 and an optical fiber controller 16. The laser-beam generator 13 may be an excimer laser, for example.

The laser controller 14 controls the laser trigger timing. The optical fiber 15 is a flexible fiber that is used to guide the laser beam to the machining site on the workpiece. The optical fiber controller 16 controls the position and attitude of the optical fiber 15 so that the laser beam is guided to a desired machining site. The discharge machining apparatus 1 has a discharge confirmation apparatus 10, which is constituted by an apparatus for measuring discharge time delay to confirm induction guidance of a discharge. The discharge confirmation apparatus 10 has an ammeter 18 and a current waveform scope 19. The ammeter 18 is provided in the circuit 7 of the discharge apparatus 3. The optical fiber controller 16 is connected to the ammeter 18. A Rogowskii coil may be used to form the ammeter 18. The current waveform scope 19 may be an oscilloscope.

In the discharge machining apparatus 1 thus configured, to perform discharge machining of a workpiece site 17 that is not in a direct line of sight from the electrode 11, the optical fiber controller 16 is used to adjust the attitude of the optical fiber 15 so that an end 20 of the optical fiber 15 faces the machining site 17. The laser controller 14 is then used to activate the laser beam generator 13 to produce a laser beam that is guided along the optical fiber 15 and thereby projected onto the site 17. A pulsed laser is used having a pulse width ranging from 10 ns to several hundred ns, and preferably is shorter than the duration time of the discharge current, described below. This takes place with the pressure in the vacuum chamber 2 has been reduced to 3000 Pa or below. The signal from the laser controller 14 triggering the laser is input to the controller 5 and the electrode controller 12. The reception of the trigger signal activates the electrode controller 12, generating a discharge from the electrode 11. The discharge is detected by the ammeter 18 measuring the discharge current. The waveform of the signal output by the ammeter 18 is read on the current waveform scope 19. The current waveform scope 19 outputs a signal to the controller 5, which calculates the time delay to the current waveform peak, relative to the timing of the input trigger signal stored in the controller 5. When the controller 5 determines that the time delay is less than a predetermined value, the controller 5 signals that induction guidance of the discharge has taken place.

An explanation will now be provided relating to a discharge having been laser-guided to a prescribed position when the time delay is less than the predetermined value.

Figure 2:
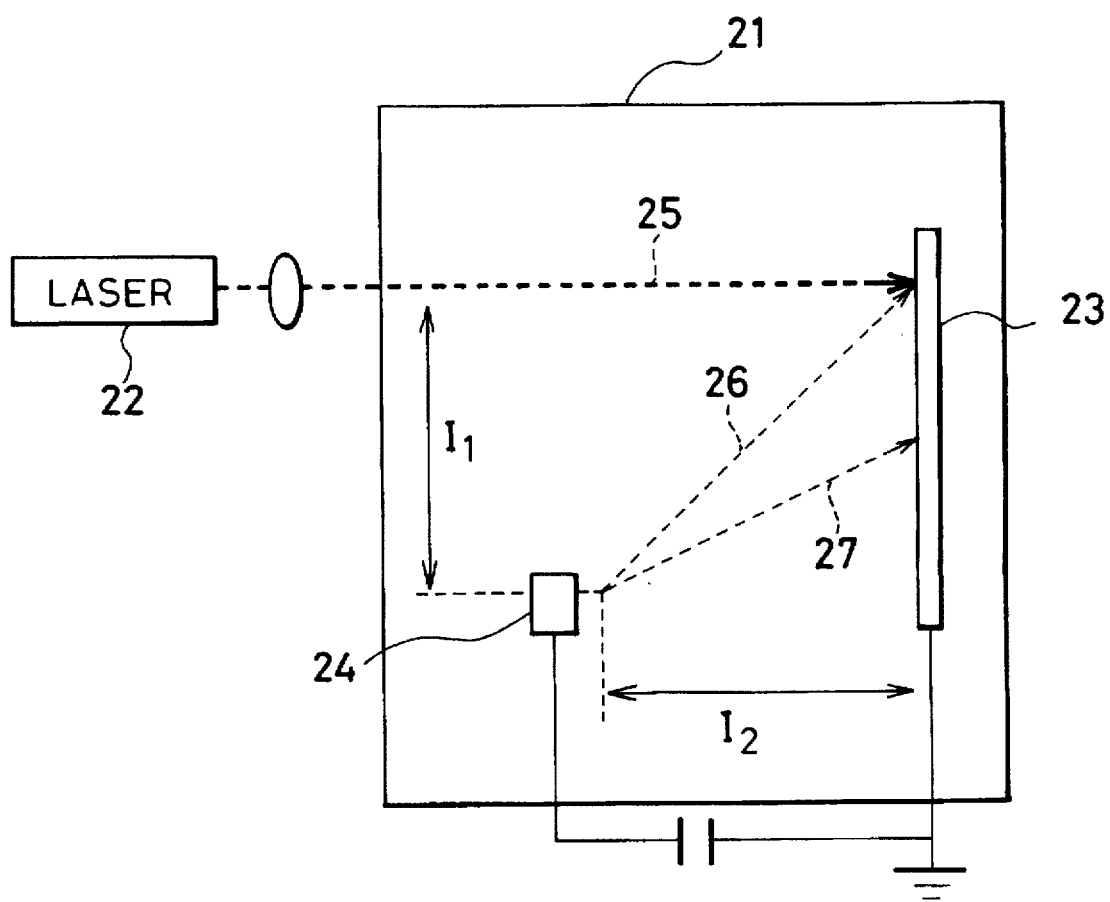
FIG. 2 is a schematic diagram of an apparatus for confirming laser beam discharge induction guidance.

As shown in FIG. 2, a workpiece in the form of a brass plate forming a cathode 23 was arranged inside a vacuum chamber 21, facing an anode 24 inside the vacuum chamber 21 and an excimer laser 22 outside the vacuum chamber 21. The apparatus was used conduct an experiment in which the cathode 23 was irradiated with a laser beam 25 (from a 248 nm KrF laser) in 23 ns pulses at a radiation energy of from 5 to 189 mJ, and the laser beam was used to induction-guide a discharge to the point being irradiated. The distance $I_1$ from the anode 24 to the laser beam 25 was 30 mm, and experiments were conducted at a distance $I_2$ between anode 24 and cathode 23 of 30 mm, 60 mm and 90 mm. The anode 24 was covered copper wire 1 mm in diameter, with just 1 mm of the copper core being exposed so that discharge occurred only at that tip. The cathode 23 was a brass plate measuring 100 mm by 100 mm by 1 mm thick. For the experiment, voltages ranging from 200 V to 1 kV were applied across the electrodes, laser beam irradiation was carried out manually, and the pressure inside the vacuum chamber 21 was reduced to between 100 Pa and 1000 Pa.

The laser beam 25 was projected onto the cathode 23 via a lens having a focal length of 300 mm, producing an irradiation spot measuring approximately 0.5 high by 4 mm across. The laser beam can be considered as having that degree of spread. When a discharge is guided, as shown by arrow 26, there is an overlap between the laser irradiation spot and the discharge point. When there is no such overlap, as indicated by arrow 27, the discharge is regarded as not having been guided by the laser beam.

Figure 3:
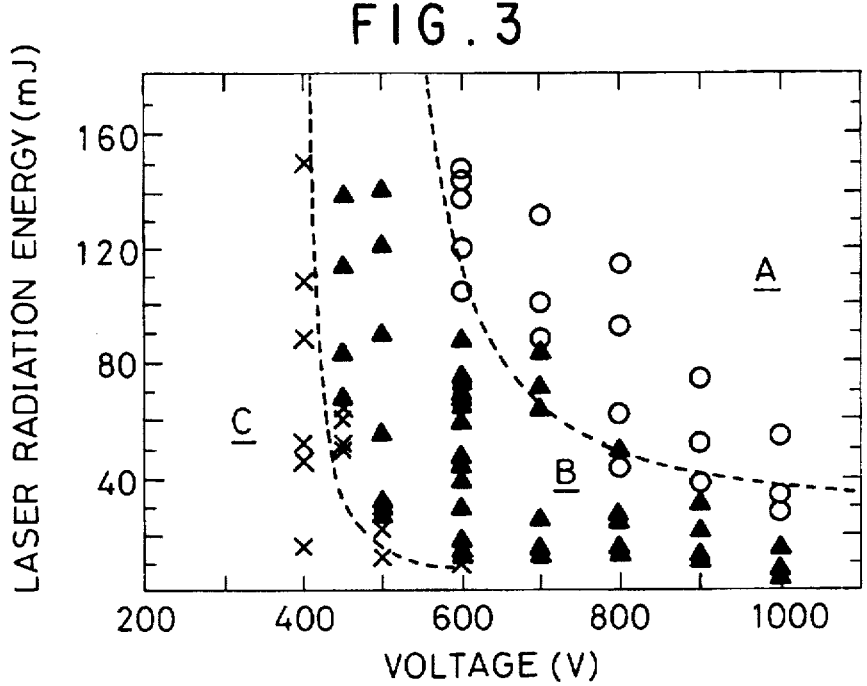
FIG. 3 is a graph showing discharge induction plotted against laser radiation energy.

FIG. 3 shows the results obtained with respect to whether discharge was induction-guided, using a discharge distance $I_2$ (distance between cathode and anode) of 42 mm and irradiating the cathode with a laser radiation energy ranging from 10 to 160 mJ, at a reduced pressure of 600 Pa. In FIG. 3, a plot inside region A indicates a guided discharge, plots in region B are of discharge that did take place but were not guided by the laser beam, while plots in region C are when discharge did not take place. When a low laser radiation energy was used, discharge did occur but was not guided by induction, even when the voltage across the electrodes was raised. Increasing the laser radiation energy produced a gradual expansion of the discharge regions to the lower voltages. However, discharge did not occur below 600 V even when the radiation energy was increased to 100 mJ or more. Lowering the pressure expanded region A to the left, meaning that discharge induction could be effected even at a lower voltage. While the areas occupied by regions A, B and C could be changed by changing the pressure, within the pressures and voltages used for the experiments, the trends observed were virtually the same as shown by FIG. 3.

Figure 4A:
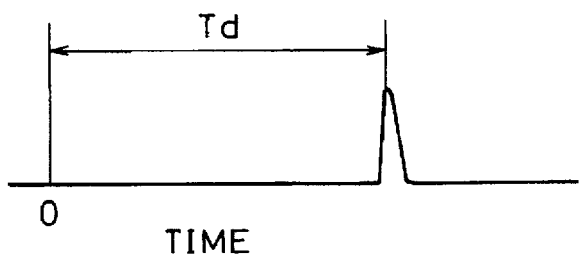
FIG. 4(a) shows the time period Td from the start of discharge to the reaching of peak discharge value.
Figure 4B:
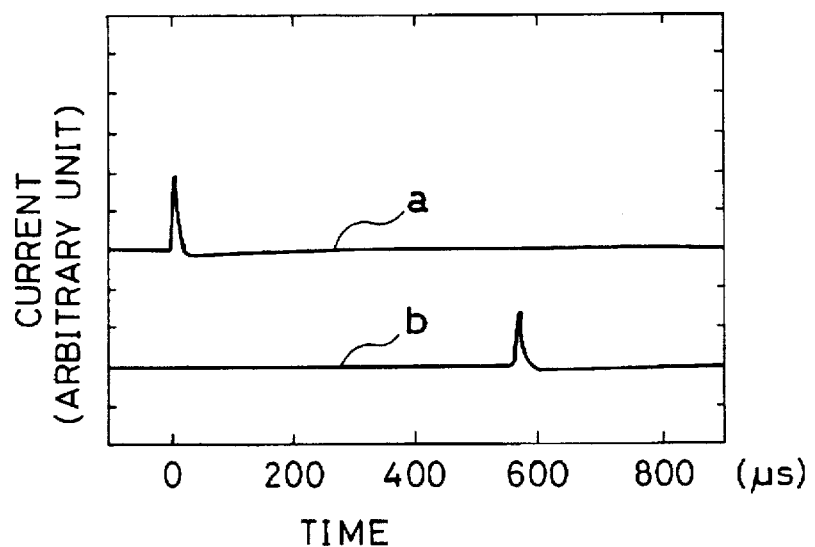
FIG. 4(b) shows Td when discharge is guided by laser induction and Td when discharge is not thus guided.

In order to next investigate the characteristics in both cases, that is, when discharge is laser guided and when it is not, an oscilloscope was used to measure the time period Td from the time the laser is triggered to the time the discharge current hits a peak (FIG. 4(a). The results are shown in FIG. 4(b), which reveals that, regardless of the voltage used, when a discharge was laser guided the time Td was 10 μs or less (curve a). As can be seen, however, when a discharge was not guided the Td to peak value was delayed by a considerable amount ranging from several hundred microseconds up to 1 ms, enabling the two cases to be readily differentiated.

Figure 5:
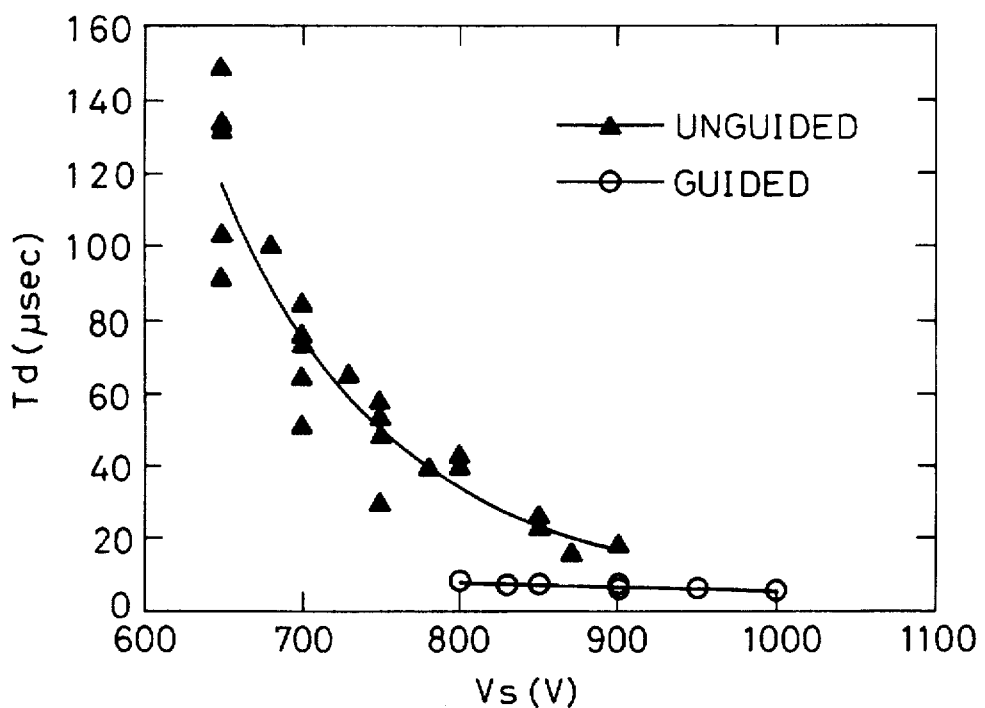
FIG. 5 is a graph showing the relationship between time period Td and discharge voltage.

The plots of FIG. 5 indicate discharges that were guided by the laser beam, using a reduced pressure of 600 Pa and voltages ranging from 600 V to 1 kV. In FIG. 5, ○ indicate a guided discharge and ▲ an unguided discharge. Whereas time Td was more or less 10 μs when a discharge was laser guided, when a discharge was not guided the time Td value was much larger, even at the same voltage, and became even larger at lower voltages.

Figure 6:
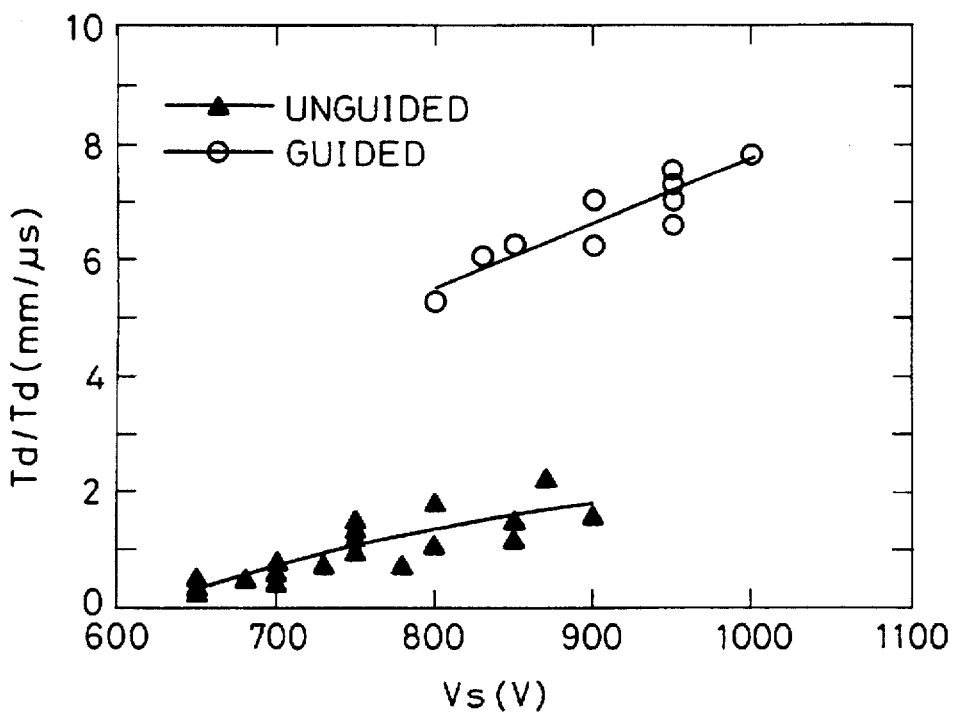
FIG. 6 is a graph showing the relationship between discharge distance divided by discharge time, and discharge voltage.

FIG. 6 was produced using values obtained by dividing discharge distance I by time Td. A discharge does not follow a straight path, so the straight-line discharge distance from the tip of the anode to the discharge impact point was approximated. The same data was used for FIGS. 5 and 6. With voltages of 600 V and 700 V being typical for the unguided group, values that in FIG. 5 seemed to indicate variation, were arranged in FIG. 6. With the delay time increasing more or less proportionally to the increase in discharge distance, the velocity at discharge initiation can be regarded as constant. This is referred to as assumed initial discharge velocity (I/Td). With respect to FIG. 6, discharges can be divided into guided and unguided discharges, with the assumed initial discharge velocity of guided discharges being 3 to 5 times higher than that of unguided discharges, at the same voltage.

It can be inferred from this that there is quite a difference between a guided discharge process and an unguided discharge process. In the case of an unguided discharge, streamer form from the dark current and result in a spark discharge, in the same way as a spontaneous discharge is produced when gas having a low conductivity is instantaneously introduced. In contrast, it is possible that when a discharge is guided, charged particles generated by the laser radiation participate directly in the discharge, which by omitting part of the spontaneous spark discharge process results in a shorter time Td.

Figure 7:
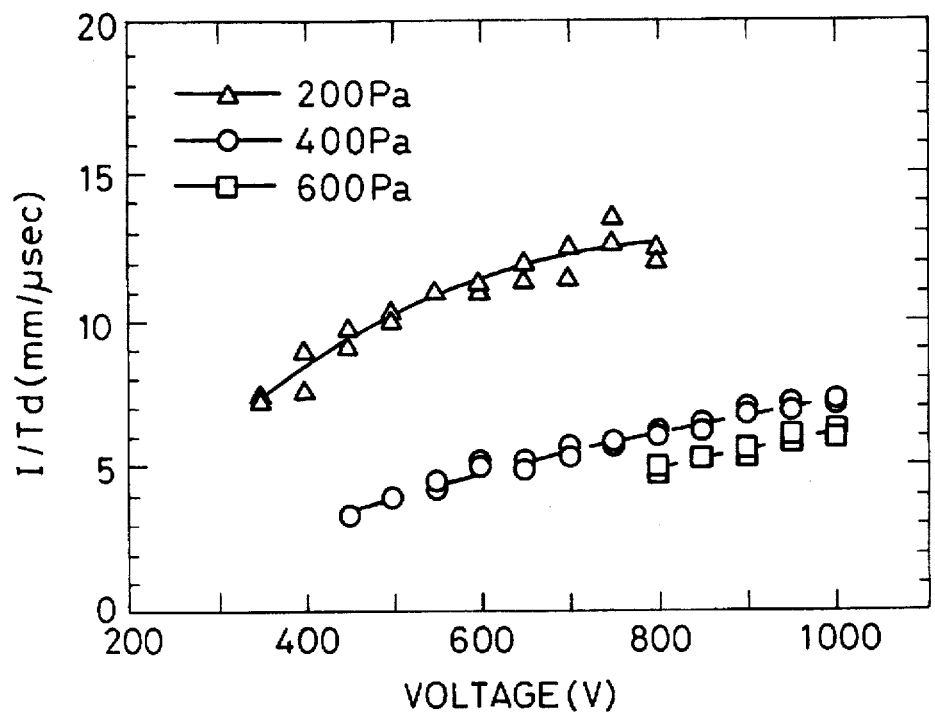
FIG. 7 is a graph showing the relationship between pressure, discharge voltage and time period Td.
Figure 8:
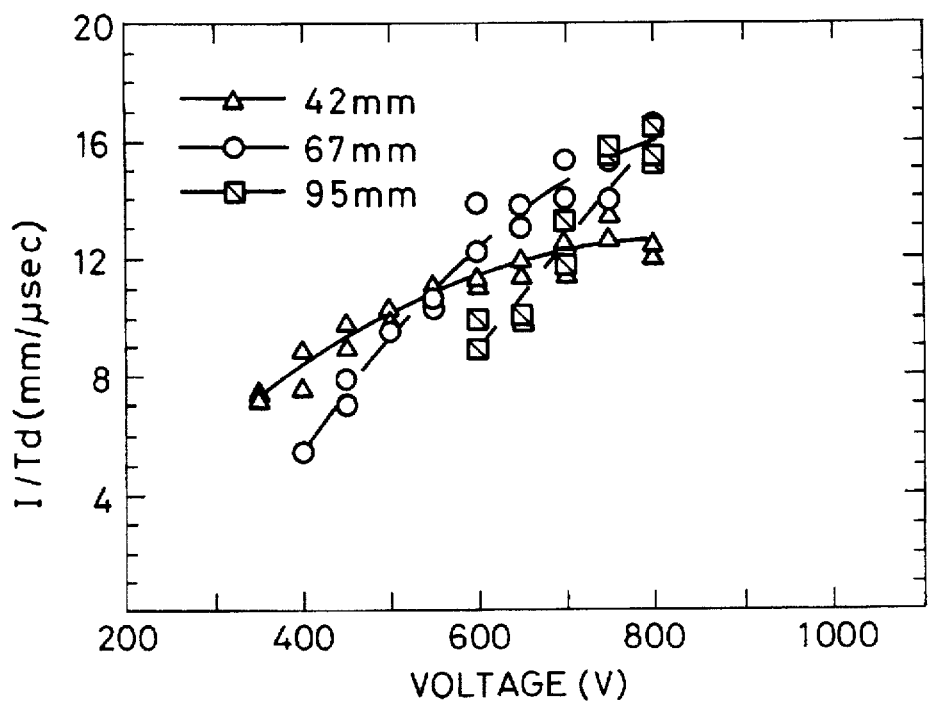
FIG. 8 is a graph showing the relationship between distance between electrodes, discharge voltage and time period Td.

Since time Td is shorter when a discharge is guided, under actual laser guided discharge machining conditions time Td can be used to monitor whether or not discharges are guided to the point being irradiated by the laser beam. FIGS. 7 and 8 are the results of an investigation of time Td characteristics during guided discharges, at different pressures and electrode-to-electrode distances ($l_2$). In the case of FIG. 7 the distance between electrodes was 42 mm, and in the case of FIG. 8 a pressure of 200 Pa was used. The graphs reveal that an increase in the voltage is accompanied by an increase in the assumed initial discharge velocity, and that since the course of the increase in the velocity closely matches an approximation based on a secondary curve, it follows that time Td is a value related to the field acceleration of charged particles. It is considered that the reason why an increase in pressure results in a decrease in the assumed initial discharge velocity is that it is caused by air molecules hindering the diffusion of charged particles produced by the laser beam, between the electrodes.

When the discharge distance is increased, as in FIG. 8, air molecules should also have an effect, as in FIG. 7. However, within this range of distances no clear effect was observed. The plots may appear to be an aggregation, but features are observable when each discharge distance is compared with a secondary curve approximation. As discharge distance (l) increases, the intersection with the x axis undergoes a shift to the right, that is, to the higher voltage side, while at the same time rising up the y axis. The fact that increasing the discharge distance produces a shift to the higher voltage side shows that if a distance is set, up to a certain voltage there is a minimum voltage at which discharge will not occur, no matter how much the experimental precision is raised, and that that voltage value increases with the increase in the discharge distance.

When the laser radiation energy is reduced, discharge still occurs, but in a region where the discharge cannot be guided. There is a clear difference in assumed initial discharge velocity between when a discharge is guided and when a discharge is not guided, and this difference can be used to confirm guidance. Lowering the pressure produces an increase in the assumed initial discharge velocity, the effect of the field strength coming into play. Depending on the distance between electrodes, there is a minimum voltage at which guidance can take place. However, a measured time of 10 μs or less from triggering of the laser to peak discharge current indicates that a discharge has been effectively guided by the laser. When a discharge has not been guided, the time will be several times to several tens of times longer. Thus, it is possible to confirm whether or not a discharge has been guided by the laser beam by measuring how long it takes to reach peak discharge current as measured from the time the laser is triggered.

The discharge machining apparatus of this invention can be used to machine the rear surface and other such parts of a workpiece, which is not possible with conventional discharge machining methods. Moreover, unlike conventional methods, this invention does not require the use of an electrode having the same shape as the shape to which the workpiece is to be machined. Furthermore, with this invention the machining contour is controlled by the laser beam spot points, without any need to move the electrode. Also, it can be confirmed whether a discharge has been guided as required by measuring the time delay at which discharge current reaches its peak. This makes it possible to precisely guide the discharge machining point by adjusting the machining condition settings, enabling precision machining. The machining operation is also facilitated by the fact that discharge timing can be controlled by laser.

What is claimed is:

1. A laser guided discharge machining apparatus, comprising:

a vacuum chamber able to accommodate a workpiece and in which it is possible to create a reduced pressure condition of 3000 Pa or below;

a discharge electrode accommodated in the vacuum chamber able to discharge charged particles;

a laser that emits a laser beam toward the vacuum chamber;

a laser guidance apparatus for guiding the laser beam to irradiate a part of the workpiece in the vacuum chamber; and a discharge delay measurement apparatus for detecting a time delay between a time at which laser irradiation is triggered and a time at which discharge takes place from the discharge electrode.

2. The laser guided discharge machining apparatus of claim 1, wherein the discharge delay measurement apparatus comprises a discharge current detector, a laser controller, and a computer that receives a signal from the discharge current detector and a trigger signal from the laser controller and calculates a discharge current time delay.

3. A laser guided discharge machining apparatus according to claim 1, wherein a pulse width of the laser beam is smaller than discharge current duration time.

* * * * *